United States Patent
Van De Stroet

(10) Patent No.: US 11,465,605 B2
(45) Date of Patent: Oct. 11, 2022

(54) VEHICLE STEERING CONTROL SYSTEMS AND METHODS

(71) Applicant: Danfoss Power Solutions, Inc., Ames, IA (US)

(72) Inventor: Caleb Van De Stroet, Inwood, IA (US)

(73) Assignee: Danfoss Power Solutions, Inc., Ames, IA (US)

(*) Notice: Subject to any disclaimer, the term of this patent is extended or adjusted under 35 U.S.C. 154(b) by 550 days.

(21) Appl. No.: 16/122,094

(22) Filed: Sep. 5, 2018

(65) Prior Publication Data
US 2020/0070804 A1    Mar. 5, 2020

(51) Int. Cl.
*B62D 5/04* (2006.01)
*B60W 10/08* (2006.01)
*B60W 10/20* (2006.01)

(52) U.S. Cl.
CPC ........... *B60W 10/20* (2013.01); *B62D 5/046* (2013.01); *B60W 10/08* (2013.01); *B60W 2540/18* (2013.01); *B60W 2554/80* (2020.02)

(58) Field of Classification Search
CPC .. B60W 10/20; B60W 2554/80; B60W 10/08; B60W 2540/18; B62D 5/046
USPC ........................................................ 701/41
See application file for complete search history.

(56) References Cited

U.S. PATENT DOCUMENTS

| | | | | |
|---|---|---|---|---|
| 5,172,785 A | * | 12/1992 | Takahashi | B60T 7/12 706/900 |
| 2004/0060765 A1 | * | 4/2004 | Mattson | B60T 8/1755 180/422 |
| 2009/0198414 A1 | | 8/2009 | Mohning et al. | |

FOREIGN PATENT DOCUMENTS

| | | |
|---|---|---|
| CN | 103702885 A | 4/2014 |
| CN | 104736414 A | 6/2015 |
| DE | 10340629 A1 | 4/2004 |
| JP | 2005075288 A | 3/2005 |
| JP | 2011025880 A | 2/2011 |
| WO | 2014049222 A1 | 4/2014 |

OTHER PUBLICATIONS

WO-2014049222-A1, Power Steering Management for a Motor Vehicle, Apr. 2014, Pugsley, Gareth et al.*
WO-2014049222-A1, Power Steering Management for a Motor Vehicle, Apr. 2014, Pugsley, Gareth et al. (Year: 2014).*
European Search Report for Serial No. 19193527.9 dated Feb. 6, 2020.

* cited by examiner

*Primary Examiner* — Jess Whittington
*Assistant Examiner* — Terry C Buse
(74) *Attorney, Agent, or Firm* — McCormick, Paulding & Huber PLLC

(57) ABSTRACT

According to the present disclosure, a steering system and method for a machine includes a vehicle control system configured to command steering of the machine, and a steering sensor in communication with the vehicle control system. The steering sensor is configured to detect a position of a steering actuator of the machine. The vehicle control system is configured to detect an acceleration rate of the machine and to command steering of the machine based at least in part on the position of the steering actuator and the acceleration rate of the machine.

15 Claims, 3 Drawing Sheets

VEHICLE STEERING CONTROL SYSTEMS AND METHODS

TECHNICAL FIELD

The present disclosure relates to machines with steering systems.

BACKGROUND

Machines, such as off-highway vehicles, include systems for both driving and steering the machines across terrain. These systems may include separate dedicated propel and steering systems or may include propel systems that also serve as steering systems. For example, in the case of dual path (dual track) vehicles, the propel system also serves as the steering system with steering operations being achieved by driving the wheels/tracks on each side of the dual path vehicle at different speeds. Machines with certain steering systems, particularly those used in off-highway applications such as dual path vehicles, become more difficult to control during acceleration events because steering gains values are optimized for steady state (constant speed) driving conditions.

SUMMARY

According to the present disclosure, a steering system for a machine comprises a vehicle control system configured to command steering of the machine, and a steering sensor in communication with the vehicle control system. The steering sensor is configured to detect a position of a steering actuator of the machine. The vehicle control system is configured to detect an acceleration rate of the machine and to command steering of the machine based at least in part on the position of the steering actuator and the acceleration rate of the machine.

According to the present disclosure, the steering system may further comprise an acceleration sensor in communication with the vehicle control system. The acceleration rate of the machine may be detected by the acceleration sensor. Alternatively, the vehicle control system may determine the acceleration rate of the machine by monitoring a control signal supplied to a propulsion system of the machine. For example, the acceleration rate may be determined by measuring a ramp rate of the control signal.

According to the present disclosure, the vehicle control system may command steering of the machine with a steady state control signal if the acceleration rate is equal to zero. The vehicle control system may command steering of the machine with a full acceleration control signal if the acceleration rate is equal to a maximum acceleration rate, where the full acceleration control signal is different than the steady state control signal. The vehicle control system may also command steering of the machine as a function of acceleration rate if the acceleration rate is between zero and the maximum acceleration rate.

According to the present disclosure, a method for steering a machine comprises detecting, through a steering sensor in communication with a vehicle control system, a position of a steering actuator of the machine, detecting, at the vehicle control system, an acceleration rate of the machine, and commanding, by the vehicle control system, steering of the machine based at least in part on the position of the steering actuator and the acceleration rate of the machine.

According to the present disclosure, acceleration of the machine may detected by an acceleration sensor in communication with the vehicle control system. Alternatively, acceleration of the machine may be detected by monitoring a control signal supplied to a propulsion system of the machine by the vehicle control system. The acceleration may be determined by measuring a ramp rate of the control signal.

According to the present disclosure, the vehicle control system may command steering of the machine with a steady state control signal if the acceleration rate is equal to zero. The vehicle control system may command steering of the machine with a full acceleration control signal if the acceleration rate is equal to a maximum acceleration rate, where the full acceleration control signal is different than the steady state control signal. The vehicle control system may also command steering of the machine as a function of acceleration rate if the acceleration rate is between zero and the maximum acceleration rate.

According to the present disclosure, a machine may comprise a body, a plurality of ground contacting elements supporting the body, a steering actuator for commanding steering, and a steering sensor configured to detect a position of the steering actuator. The machine may further comprise a vehicle control system operatively connected to the steering sensor and the plurality of ground contacting elements. The vehicle control system may be configured to command the plurality of ground contacting elements to propel and steer the machine. The vehicle control system is configured to detect an acceleration rate of the machine and to command steering based at least in part on the position of the steering actuator and the acceleration rate of the machine.

According to the present disclosure, the machine may further comprise an acceleration sensor in communication with the vehicle control system. The acceleration rate of the machine may be detected by the acceleration sensor. Alternatively, the vehicle control system may determine the acceleration rate of the machine by monitoring a ramp rate of a control signal generated by the vehicle control system to command propulsion of the machine.

According to the present disclosure, the vehicle control system of the machine may be configured to command steering of the machine with a steady state control signal if the acceleration rate is equal to zero. The vehicle control system may be configured to command steering of the machine with a full acceleration control signal if the acceleration rate is equal to a maximum acceleration rate, where the full acceleration control signal is different than the steady state control signal. The vehicle control system may also be configured to command steering of the machine as a function of acceleration rate if the acceleration rate is between zero and the maximum acceleration rate.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the controllers, systems, and methods described herein may be adapted and modified as is appropriate for the application being addressed and that the controllers, systems, and methods described herein may be employed in other suitable applications, and that such other additions and modifications will not depart from the scope thereof.

Figure 1:
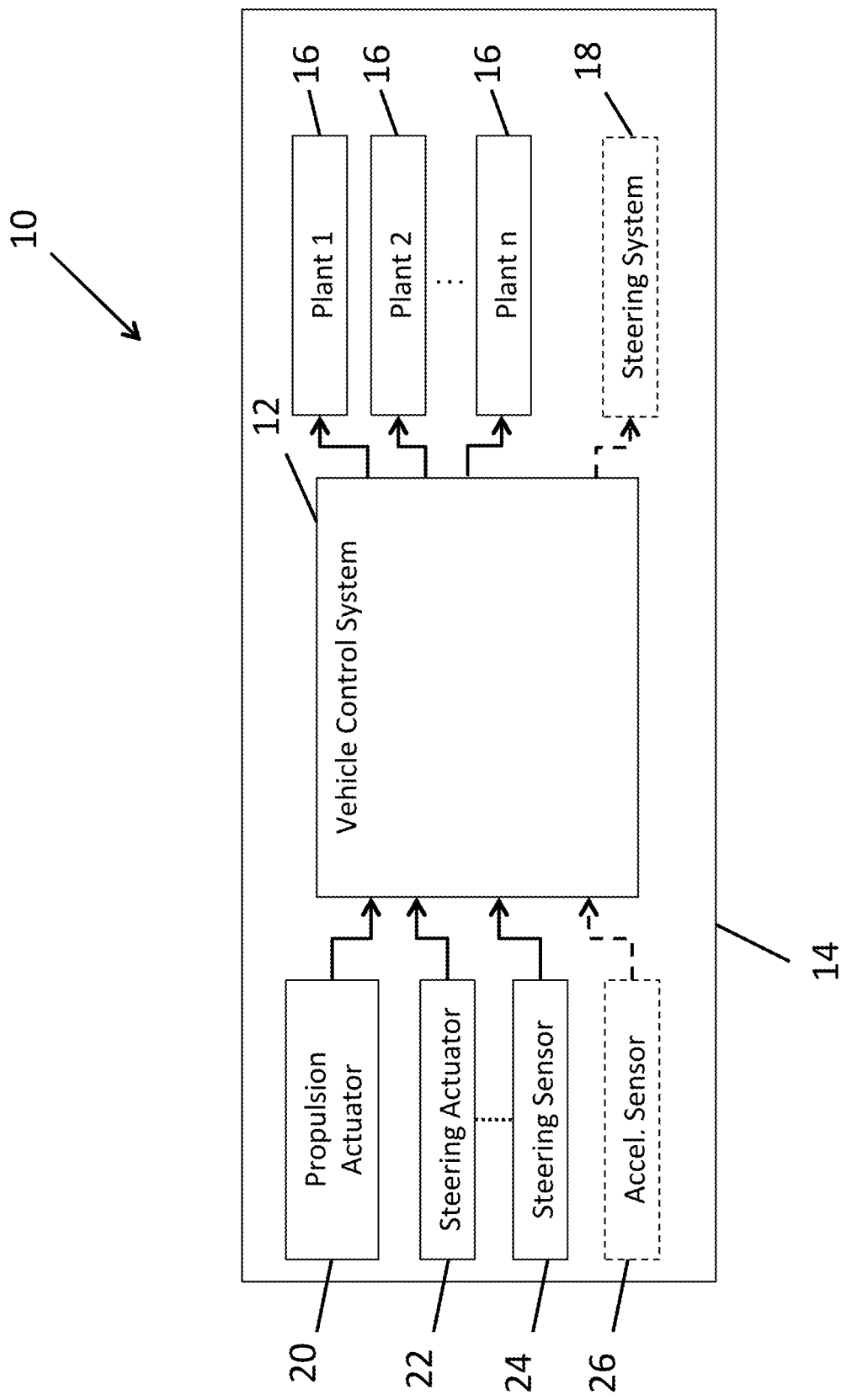
FIG. 1 is a schematic diagram of a machine comprising the vehicle control system according to the present disclosure.

Referring to FIG. 1, a machine 10 including a vehicle control system 12 for providing optimized steering according to the present disclosure is shown. The machine 10 may be any vehicle with a steering system, including single path (single track) and dual path (dual track) vehicles. For example, the machine may be an off-highway vehicle such as a skid steer, tractor, fork lift, bulldozer, backhoe, crane, cherry picker, all-terrain vehicle or the like.

The machine 10 includes a body 14 and at least one plant 16 operatively coupled to one or more wheels, treads, and/or other similar driving elements for propelling the body 14 across terrain. In some applications, such as where the machine 10 is a dual path vehicle, the machine 10 may include at least two plants 16, i.e. a left plant and a right plant, that are configured to propel the body 14 across terrain and also to provide steering for the machine 10 by being driven at different speeds. In other applications, such as where the machine is a single path vehicle, the machine 10 may include a dedicated steering system 18 controlled by the vehicle control system 12 for steering the machine 10, while the at least one plant 16 provides propulsion. The at least one plant 16 and/or the steering system 18 may include mechanical and/or hydraulic systems, such as motors, pumps, and/or other similar hydraulic and/or mechanical elements.

The machine also includes a propulsion actuator 20 and a steering actuator 22 that are each operatively connected to the vehicle control system 12 and provide input thereto. The machine 10 also includes a steering sensor 24 configured to detect a degree of actuation of the steering actuator 22 and may also include an acceleration sensor 26 disposed on the body 14 and configured to detect acceleration of the machine 10. The steering sensor 24 and the acceleration sensor 26, if present, are operatively connected to the vehicle control system 12 and configured to provide input thereto.

The propulsion actuator 20 and the steering actuator 22 may be any suitable known actuators for imparting driving and steering movement, respectively, to the machine 10 including any known operator control for the various machines listed above. For example, the propulsion actuator 20 may include one or more joysticks, pedals, or any other similar operator controls. Similarly, the steering actuator 22 may include a steering wheel, one or more joysticks, pedals, or any other similar operator controls. Additionally, although shown and described separately for simplicity, the propulsion actuator 20 and steering actuator 22 may be a single actuator able to command both propulsion and steering, such as a joystick or the like.

The vehicle control system 12, at least one plant 16, optional steering system 18, propulsion actuator 20, steering actuator 22, steering sensor 24, and acceleration sensor 26, if included, as well as other various subsystems of the machine 10, may be connected to one another over a Controller Area Network (CAN or CAN bus) or other similar network that allows the various control systems, controllers, plants, actuators, sensors, and various other subsystems, microprocessors, and/or any other devices connected to the CAN or other similar network to communicate with one another using CAN or other communication protocols known in the art.

The vehicle control system 12 includes all of the necessary electronics, software, memory, storage, databases, firmware, logic/state machines, microprocessors, communication links, and any other input/output interfaces to perform the functions described herein and/or to achieve the results described herein. For example, the vehicle control system 12 may include, or be in communication with, one or more processors and memory, which may include system memory, including random access memory (RAM) and read-only memory (ROM). Suitable computer program code may be provided to the vehicle control system 12 for executing numerous functions, including those discussed herein in connection with optimizing steering of the machine 10.

The one or more processors may include one or more conventional microprocessors and may also include one or more supplementary co-processors such as math co-processors or the like. The one or more processors may be configured to communicate with other networks and/or devices such as servers, other processors, computers, cellular telephones, tablets and the like.

The one or more processors may be in communication with the memory, which may comprise magnetic, optical and/or semiconductor memory, such as, for example, random access memory ("RAM"), read only memory ("ROM"), flash memory, optical memory, or a hard disk drive memory. Memory may store any data and/or information typically found in computing devices, including an operating system, and/or one or more other programs (e.g., computer program code and/or a computer program product) that are stored in a non-transitory memory portion and adapted to direct the vehicle control system 12 to perform according to the various embodiments discussed herein. The vehicle control system 12, and/or portions thereof, and/or any other programs may be stored, for example, in a compressed format, an uncompiled and/or an encrypted format, and may include computer program code executable by the one or more processors. The executable instructions of the computer program code may be read into a main memory of the one or more processors from a non-transitory computer-readable medium other than the memory. While execution of sequences of instructions in the program causes the one or more processors to perform the process steps described herein, hard-wired circuitry may be used in place of, or in combination with, executable software instructions for implementation of the processes of the present invention. Thus, embodiments of the present invention are not limited to any specific combination of hardware and software.

For example, the methods and systems discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing workflow analysis. In an embodiment, an application of executable code may be a compilation of many instructions, which may be distributed over several different code partitions or segments, among different programs, and across several devices. Where spread across multiple devices, the devices may be operatively connected to one another over the CAN bus or other similar network.

The term "computer-readable medium" as used herein refers to any medium that provides or participates in providing instructions and/or data to the one or more processors of the vehicle control system 12 (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 2:
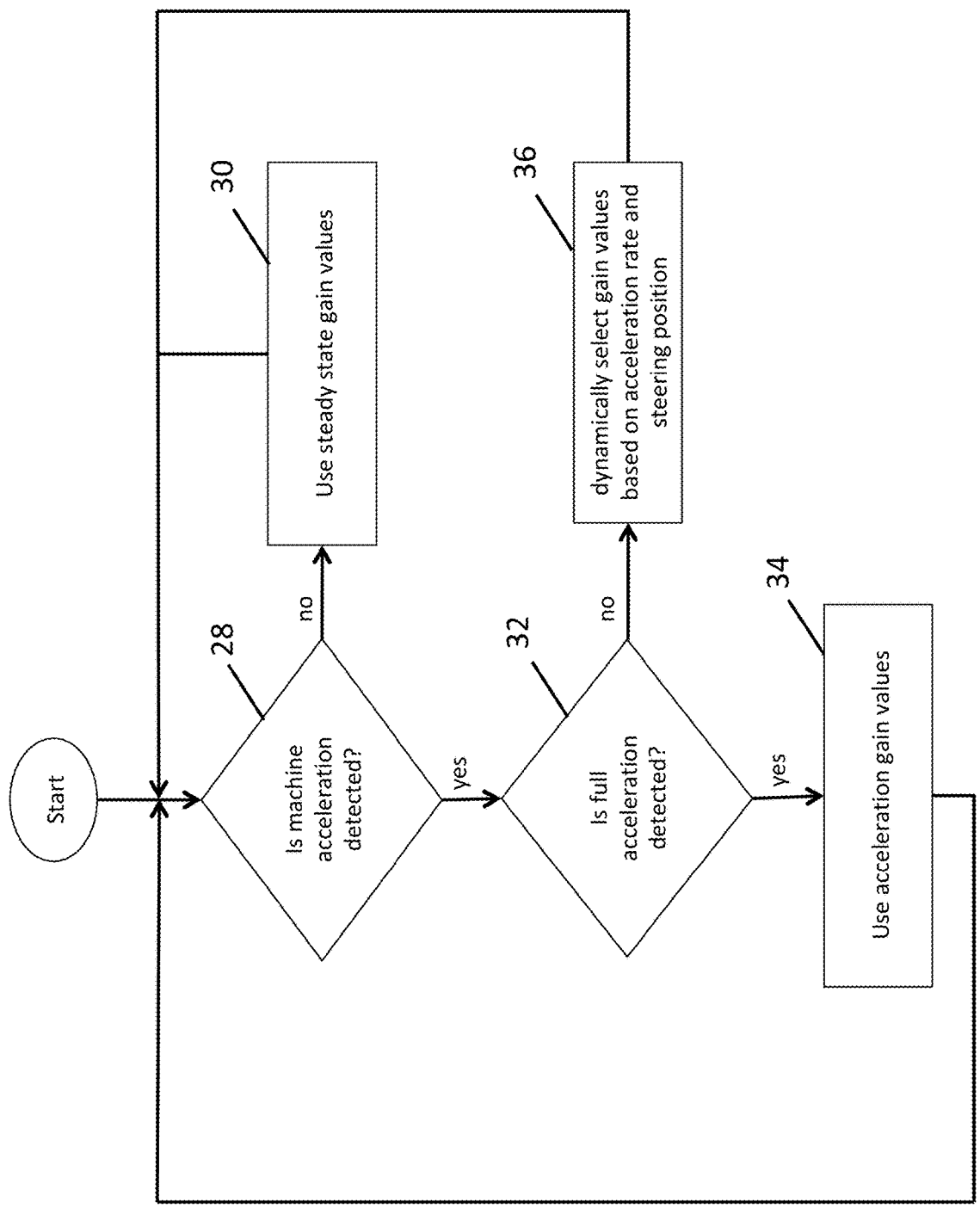
FIG. 2 is a schematic control diagram the steering control provided by the vehicle control system in the machine of FIG. 1.

FIG. 2 illustrates the steering control method implemented by the vehicle control system 12 for selecting steering gains during operation of the machine 10, wherein the vehicle control system 12 employs the optimum steering gains for both stead state (constant speed) and full acceleration conditions and dynamically changes the steering gains as a function of the rate of acceleration when the machine 10 is between steady state and full acceleration conditions. At step 28, the vehicle control system 12 evaluates whether or not machine acceleration is detected. For example, the vehicle control system 12 may estimate acceleration of the machine 10 by monitoring a ramp rate of the propulsion control signal sent to the at least one plant 16. The ramp rate of the propulsion control signal, i.e. the rate at which the control signal is increasing or decreasing, correlates to machine acceleration and, therefore, may provide a good indication thereof. Alternatively, the vehicle control system 12 may detect acceleration through the acceleration sensor 26, if one is included in the machine 10. If the vehicle control system 12 does not detect machine acceleration at step 28, the vehicle control system 12 uses steady state gain values at step 30 for providing the steering output control signal sent to the plants 16 or steering system 18 for steering the machine 10.

Alternatively, if the vehicle control system 12 detects machine acceleration at step 28, the vehicle control system 12 evaluates whether or not the machine 10 is at full acceleration at step 32. If the vehicle control system 12 detects full (maximum) acceleration at step 32, the vehicle control system 12 uses acceleration gain values at step 34 for providing the steering output control signal sent to the plants 16 or steering system 18 for steering the machine 10. If the vehicle control system 12 detects full acceleration, at step 36, the vehicle control system 12 dynamically selects gain values as a function of the acceleration rate and steering position while providing the steering output control signal sent to the plants 16 or steering system 18 for steering the machine 10. As discussed above, the vehicle control system 12 may use the ramp rate of the propulsion control signal sent to the at least one plant 16 as the machine acceleration rate or, alternatively, the machine acceleration rate may be detected through acceleration sensor 26, if one is included in the machine 10. For steering position, the vehicle control system 12 uses the steering position signal received from the steering sensor 24.

Figure 3:
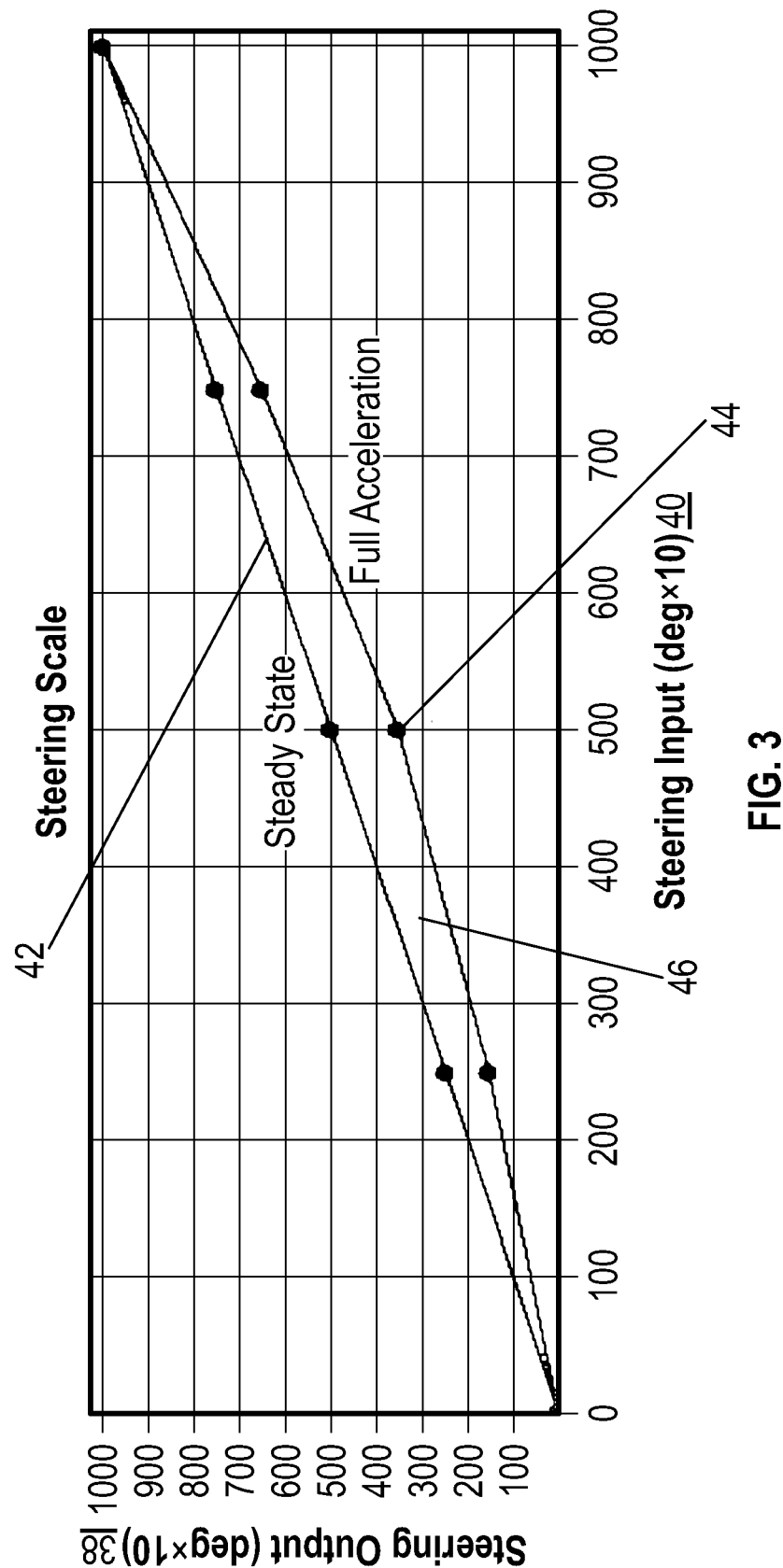
FIG. 3 is a graphical representation of steering signals of the vehicle control system in the machine of FIG. 1.

Referring to FIG. 3, steering output 38 as a function of steering input angle 40 as provided by the vehicle control system 12 according to the present disclosure is shown. A steady state line 42 shows the steering output 38 as a function of steering input angle 40 using the steady state gains to control machine steering as discussed in connection with step 30, shown in FIG. 2. Similarly, a full acceleration line 44 shows the steering output 38 as a function of steering input angle 40 using the full acceleration gains to control machine steering as discussed in connection with step 34, shown in FIG. 2. As seen in FIG. 3, at any non-zero steering input angle 40, the full acceleration steering output 44 differs from the steady state steering output 42. A dynamic region 46 between the steady state line 42 and full acceleration line 44 is where the vehicle control system 12 dynamically selects steering gain values based on acceleration rate and steering position as discussed in connection with step 36, shown in FIG. 2.

When calculating steering output 38 in the dynamic region 46, i.e. when the machine is accelerating or decelerating between steady state and full acceleration, the vehicle control system 12 may use the rate of acceleration to interpolate between the steady state gains and the full acceleration gains for the particular steering input angle 40 as detected by the steering sensor 24, shown in FIG. 1. For example, if the rate of acceleration is determined to be fifty percent (50%) of full acceleration, the vehicle control system 12 may select steering gains halfway, i.e. fifty percent (50%), between steady state and full acceleration.

By employing the optimal steering gain values for both steady state and full acceleration conditions and by dynamically changing the steering gains according to the rate of acceleration in between the steady state and full acceleration conditions, the vehicle control system 12 of the present disclosure advantageously optimizes steering performance during all acceleration and steady state driving conditions. Thus, the vehicle control system 12 advantageously improves handling of the machine 10 and provides the machine operator with greater control and confidence. Additionally, as a result of the improved machine handling, the machine 10 may be able to achieve higher top speeds with increased control, since controllability and handling are typically the limiting factors in machine top speed.

While various embodiments have been described in the present disclosure, it will be appreciated by those of ordinary skill in the art that modifications can be made to the various embodiments without departing from the spirit and scope of the invention as a whole. Accordingly, the particular embodiments described in this specification are to be taken as merely illustrative and not limiting.

What is claimed is:
1. A steering system for a machine, the steering system comprising:
　a vehicle control system configured to command steering of the machine; and
　a steering sensor in communication with the vehicle control system, the steering sensor configured to detect a position of a steering actuator of the machine;
　wherein the vehicle control system is configured to detect an acceleration rate of the machine and to command steering of the machine based at least in part on the position of the steering actuator and the acceleration rate of the machine; and
　wherein the vehicle control system determines the acceleration rate of the machine by monitoring a control signal supplied to a propulsion system of the machine by the vehicle control system and measuring a ramp rate of the control signal.

2. The steering system according to claim 1, further comprising:
　an acceleration sensor in communication with the vehicle control system, the acceleration rate of the machine being detected by the acceleration sensor.

3. The steering system according to claim 1, wherein the vehicle control system is configured to command steering of the machine with a steady state control signal if the acceleration rate is equal to zero.

4. The steering system according to claim 3, wherein the vehicle control system is configured to command steering of the machine with a full acceleration control signal if the acceleration rate is equal to a maximum acceleration rate, the full acceleration control signal being different than the steady state control signal.

5. The steering system according to claim 4, wherein the vehicle control system is configured to command steering of the machine as a function of acceleration rate if the acceleration rate is between zero and the maximum acceleration rate.

6. A method for steering a machine, the method comprising:
  detecting, through a steering sensor in communication with a vehicle control system of the machine, a position of a steering actuator of the machine;
  detecting, at the vehicle control system of the machine, an acceleration rate of the machine; and
  commanding, by the vehicle control system, steering of the machine based at least in part on the position of the steering actuator and the acceleration rate of the machine;
  wherein acceleration of the machine is detected by monitoring a control signal supplied to a propulsion system of the machine by the vehicle control system and measuring a ramp rate of the control signal.

7. The method according to claim 6, wherein acceleration of the machine is detected by an acceleration sensor in communication with the vehicle control system.

8. The method according to claim 6, wherein the vehicle control system commands steering of the machine with a steady state control signal if the acceleration rate is equal to zero.

9. The method according to claim 8, wherein the vehicle control system commands steering of the machine with a full acceleration control signal if the acceleration rate is equal to a maximum acceleration rate, the full acceleration control signal being different than the steady state control signal.

10. The method according to claim 9, wherein the vehicle control system commands steering of the machine as a function of acceleration rate if the acceleration rate is between zero and the maximum acceleration rate.

11. A machine comprising:
  a body;
  a plurality of ground contacting elements supporting the body on a surface;
  a steering actuator for commanding steering;
  a steering sensor configured to detect a position of the steering actuator; and
  a vehicle control system operatively connected to the steering sensor and the plurality of ground contacting elements, the vehicle control system configured to command the plurality of ground contacting elements to propel and steer the machine;
  wherein the vehicle control system is configured to detect an acceleration rate of the machine and to command steering based at least in part on the position of the steering actuator and the acceleration rate of the machine; and
  wherein the vehicle control system determines the acceleration rate of the machine by measuring a ramp rate of a control signal generated by the vehicle control system to command propulsion of the machine.

12. The machine according to claim 11, further comprising:
  an acceleration sensor in communication with the vehicle control system, the acceleration rate of the machine being detected by the acceleration sensor.

13. The machine according to claim 11, wherein the vehicle control system is configured to command steering of the machine with a steady state control signal if the acceleration rate is equal to zero.

14. The machine according to claim 13, wherein the vehicle control system is configured to command steering of the machine with a full acceleration control signal if the acceleration rate is equal to a maximum acceleration rate, the full acceleration control signal being different than the steady state control signal.

15. The machine according to claim 14, wherein the vehicle control system is configured to command steering of the machine as a function of acceleration rate if the acceleration rate is between zero and the maximum acceleration rate.

* * * * *